United States Patent
Brady et al.

(10) Patent No.: US 10,326,373 B1
(45) Date of Patent: Jun. 18, 2019

(54) PROGRAMMABLE SWITCHING CONVERTER

(71) Applicant: TEXAS INSTRUMENTS INCORPORATED, Dallas, TX (US)

(72) Inventors: Philomena Cleopha Brady, Corinth, TX (US); Ananthakrishnan Viswanathan, Allen, TX (US); Shanguang Xu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 15/874,697

(22) Filed: Jan. 18, 2018

Related U.S. Application Data

(60) Provisional application No. 62/611,811, filed on Dec. 29, 2017.

(51) Int. Cl.
| | | |
|---|---|---|
| *H02M 3/335* | (2006.01) | |
| *H02M 1/42* | (2007.01) | |
| *H02M 1/08* | (2006.01) | |
| H02M 1/00 | (2006.01) | |

(52) U.S. Cl.
CPC ......... *H02M 3/33515* (2013.01); *H02M 1/42* (2013.01); *H02M 1/08* (2013.01); *H02M 2001/0054* (2013.01)

(58) Field of Classification Search
CPC ............ H02M 1/42; H02M 1/44; H02M 1/08; H02M 1/083; H02M 1/088; H02M 2001/0025; H02M 2001/0009; H02M 2001/0054; H02M 2001/0058; H02M 3/156; H02M 3/157; H02M 3/158; H02M 1/32; H02M 3/33515
See application file for complete search history.

(56) References Cited

U.S. PATENT DOCUMENTS

| | | | | |
|---|---|---|---|---|
| 2003/0178980 A1* | 9/2003 | Biagi | ...................... | G05F 1/575 323/282 |
| 2007/0279820 A1* | 12/2007 | Fang | .................... | H02H 7/1203 361/97 |
| 2010/0060340 A1* | 3/2010 | Hester | .................. | H03K 17/164 327/401 |
| 2010/0219877 A1* | 9/2010 | Tai | .......................... | H02M 1/08 327/398 |
| 2012/0043994 A1* | 2/2012 | Alvarez Valenzuela | ..................... | H03K 17/042 327/82 |
| 2013/0069608 A1* | 3/2013 | Gakhar | .................. | G05F 1/575 323/273 |

(Continued)

*Primary Examiner* — Gustavo A Rosario-Benitez
(74) *Attorney, Agent, or Firm* — Tuenlap Chan; Charles A. Brill; Frank D. Cimino

(57) ABSTRACT

A switching converter is provided that includes a power MOSFET, a controller having a drive pin connected to a gate terminal of the power MOSFET, and a resistor connected to the gate terminal. A compensation time selection circuit is included that has compensation times stored therein. A compensation time is selected from the compensation times based on a value of the resistor and stored in the controller. The selected compensation time compensates for an inherent delay in switching the power MOSFET to an ON state after the power MOSFET receives a signal to switch to the ON state to allow the power MOSFET to switch to the ON state when a drain voltage of the power MOSFET's reaches its lowest value during a switching cycle.

12 Claims, 5 Drawing Sheets

(56) References Cited

U.S. PATENT DOCUMENTS

| | | | |
|---|---|---|---|
| 2014/0056036 A1* | 2/2014 | Pan | H02M 7/217 |
| | | | 363/21.12 |
| 2014/0132236 A1* | 5/2014 | Darmawaskita | H02M 3/156 |
| | | | 323/283 |
| 2014/0355309 A1* | 12/2014 | Akondy | H02M 3/335 |
| | | | 363/16 |
| 2015/0171859 A1* | 6/2015 | Pisau | H03K 17/165 |
| | | | 327/379 |
| 2015/0244275 A1* | 8/2015 | Hinz | H02M 3/33507 |
| | | | 363/21.17 |
| 2016/0255685 A1* | 9/2016 | Melanson | H05B 33/0815 |
| | | | 327/109 |
| 2016/0255686 A1* | 9/2016 | Zanbaghi | H02M 1/00 |
| | | | 315/210 |

\* cited by examiner

PROGRAMMABLE SWITCHING CONVERTER

RELATED APPLICATIONS

This application claims priority from U.S. Provisional Application Ser. No. 62/611,811, filed 29 Dec. 2017, which is incorporated herein in its entirety.

TECHNICAL FIELD

This relates to a switching converter having a programmable controller.

BACKGROUND

Power factor correction in a power supply forces an input current to follow an input voltage so that any electrical load appears like a resistor. Power factor correction (PFC) converters, however, can cause hard switching instances when the MOSFET is operated under critical conduction mode (Crm) or continuous conduction mode (CCM). Hard switching causes high switching losses and reduces the efficiency of the PFC converter. The switching losses can be minimized when a drain voltage of a power MOSFET of the PFC converter is turned on at its lowest value known as a valley switching point. Although the zero current of boost inductor can be detected (ZCD), there is an inherent time delay between zero current point and the valley voltage of power MOSFET. In other words, when the zero current of the inductor is first detected, the power MOSFET's drain voltage is not at the valley switching point.

SUMMARY

In described examples, a switching converter is provided that includes a power MOSFET having a gate terminal connected to a gate node, a controller having a drive pin connected to the gate node, and a resistor connected to the gate node. A compensation time selection circuit has a plurality of compensation times stored therein, wherein a compensation time is selected from the plurality of compensation times based on a value of the resistor and stored in the controller. The selected compensation time compensates for an inherent delay in switching the power MOSFET to an ON state after the power MOSFET receives a signal to switch to the ON state to allow the power MOSFET to switch to the ON state when a drain voltage of the power MOSFET's reaches its lowest value during a switching cycle.

In another example, a switching converter is provided that includes a power MOSFET having a gate terminal connected to a gate node and a compensation time programming circuit. The compensation time programming circuit includes a drive pin of a controller, the drive pin connected to the gate node, a resistor connected to the gate node, and a current source that supplies a first current through the drive pin via a switch and through the resistor where a value of the current is based on a value of the resistor. A compensation time selection circuit converts a second current from the current source to a digital value, the compensation time selection circuit having a plurality of compensation times stored therein. A compensation time is selected from the plurality of compensation times based on a value of the digital value of the second current. The selected compensation time compensates for an inherent delay in switching the power MOSFET to an ON state after the power MOSFET receives a signal to switch to the ON state to allow the power MOSFET to switch to the ON state when a drain voltage of the power MOSFET's reaches its valley switching point during a switching cycle.

In another example, a method of programming a switching converter is provided that includes selecting a resistor having a value that corresponds to a valley switching point of a drain voltage of a power MOSFET and attaching the resistor to a gate terminal of the power MOSFET and to a voltage input pin of a controller in the switching converter to form a gate node. The method further includes applying a voltage to an input pin of a controller in the switching converter, generating a first current through the drive pin via a switch and through the resistor, and generating a second current having a same value as the first current through a compensation time selection circuit where the compensation time selection circuit transforms the second current into a digital value. A digital value of the second current is correlated with a compensation time from a plurality of compensation times stored in the compensation time selection circuit and the correlated compensation time is programmed in the controller. The programmed compensation time compensates for an inherent delay in switching the power MOSFET to an ON state after the power MOSFET receives a signal to switch to the ON state to allow the power MOSFET to switch to the ON state when a drain voltage of the power MOSFET's reaches the valley switching point during a switching cycle.

DETAILED DESCRIPTION

Disclosed herein is an example system and method for programming a compensation time into a switching converter (switching power supply). The compensation time compensates for a time delay that a power MOSFET, which is driven by the switching converter, receives a signal to turn on and when the power MOSFET turns on. More specifically, the programmed compensation time is programmed to allow time for the power MOSFET to turn on so that the power MOSFET switches ON when an inductor current $I_L$ of a corresponding power (boost) inductor is zero, known as a zero current detection (ZCD) point. The ZCD point of the power inductor corresponds with a valley switching point (VSP) of the power MOSFET. Thus, the compensation time is programmed so that the power MOSFET turns ON at the valley switching point of the power MOSFET. The valley switching point of the power MOSFET occurs when a drain voltage $V_{DS}$ of the power MOSFET reaches its lowest value, just above zero volts (e.g., 0.7 volts) during the ON/OFF switching cycles. A body diode of the power MOSFET clamps the drain voltage $V_{DS}$ at the lowest value. Thus, the drain voltage $V_{DS}$ of the power MOSFET does not dip below zero volts.

As will be explained in more detail below, to program the compensation time into the switching power supply, an external resistor is connected to an existing pin (e.g., a drive pin) in an integrated circuit (IC) such as a controller (e.g., power factor correction controller) disposed in the switching power supply. A voltage is applied to the controller, which generates a current through the external resistor. A measured value of the current corresponds to one of multiple compensation times stored in the controller. The corresponding compensation time is programmed in the controller and during operation of the switching power supply, the programmed compensation time compensates for an inherent delay that it takes for the power MOSFET to turn ON so that the power MOSFET is in an ON state at the power MOSFET's VSP mentioned above.

Switching at the VSP of the power MOSFET mitigates hard switching, which in turn reduces switching losses, power conversion losses, and reduces EMI/RFI noise. Hard switching occurs when the current and voltage transitions are not smooth during switching. In an attempt to reduce hard switching and achieve soft switching (smooth current and voltage transitions), conventional methods must utilize additional power components in the switching power supply. For example, an additional inductor coil in the switching power supply and/or an additional pin in the controller are added in order to reduce hard switching. Additional power components, however, add size and consequently cost to the switching power supply.

Figure 1:
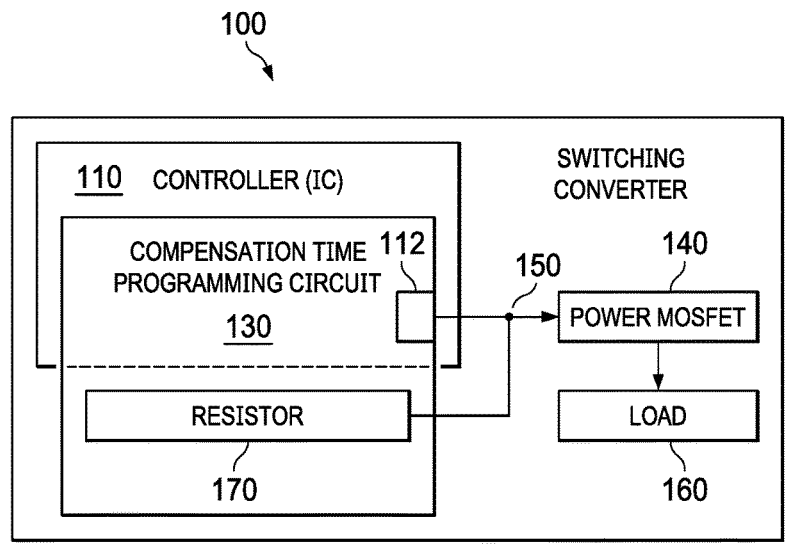
FIG. 1 is a block diagram of an example switching converter

FIG. 1 is a block diagram of an example switching converter (switching power supply) 100 that includes an integrated circuit (IC) 110 and a compensation time programming circuit 130 that overcomes the disadvantages associated with conventional systems and methods previously mentioned. The IC may be a controller (e.g., power factor correction controller) 110 that includes a drive pin 112. A power MOSFET 140 is connected to the drive pin 112 via a gate node 150. Thus, during operation of the switching converter 100, the controller 110 drives the power MOSFET 140, which in turn drives a load 160. A resistor 170, which is disposed externally to the controller 110 is connected to the drive pin 112 via the gate node 150.

Multiple compensation times are stored in the controller 110 and during a programming sequence (described further below) one compensation time is chosen from the multiple compensation times and programmed into the controller 110. The programming sequence includes applying a voltage to the drive pin 112 and generating a current through the resistor 170. A measured value of the current corresponds to one of the multiple compensation times stored in the controller 110. The corresponding compensation time is then stored in the controller 110. Thus, the compensation time is chosen and stored in the controller 110 based on the value of the measured current, which is based on a value of the resistor 170. After the compensation time is programmed into the controller 110, the compensation time remains the same during operation of the switching converter 100.

Figure 3:
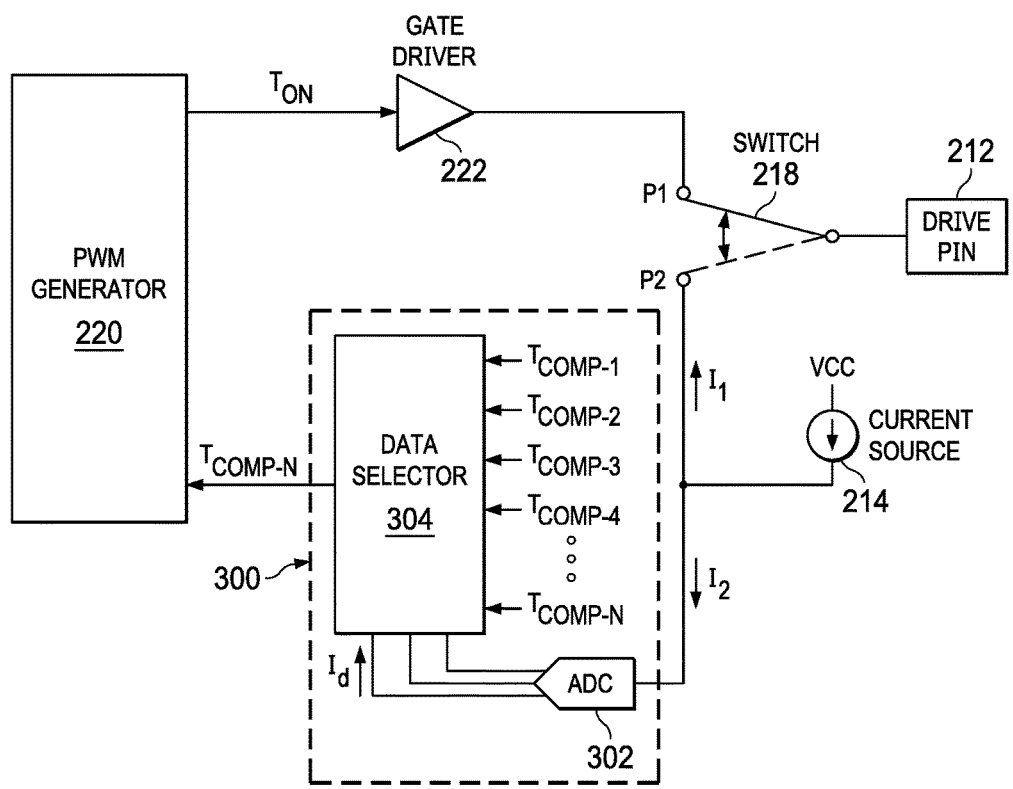
FIG. 3 is an example compensation time selection circuit for an example switching converter.
Figure 2:
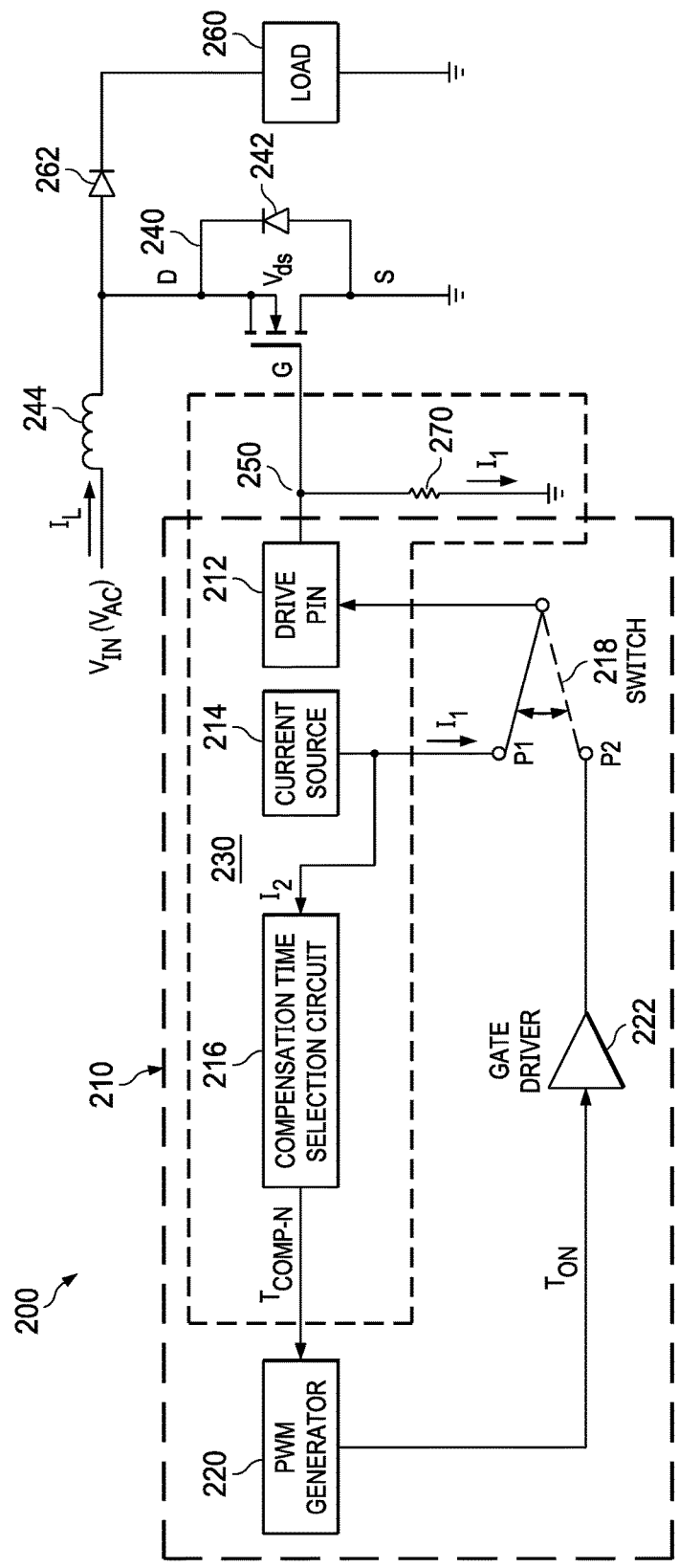
FIG. 2 is a schematic illustration of an example switching converter having a compensation parameter programming circuit.

Referring to FIGS. 2 and 3, FIG. 2 is an illustration of an example switching converter 200 that includes an integrated circuit (IC) such as a controller (e.g., power factor correction controller) 210 and a compensation parameter (time) programming circuit 230. The controller 210 includes a drive pin 212, a current source 214, and a compensation time selection circuit 216, shown in FIG. 3. During the compensation time programming sequence, the current source 214 generates and supplies a first current $I_1$ through the drive pin 212 via a switch 218. A second current $I_2$ that mirrors (has the same value) as the first current $I_1$ is driven through the compensation time selection circuit 216. A pulse width modulation (PWM) generator 220 and a gate driver 222 are provided in the controller 210 that drive the drive pin 212 at the compensation time after the compensation time is programmed into the controller 210.

A power MOSFET 240 is connected to the drive pin 212 via a gate node 250 that is connected to a gate G of the power MOSFET 240. The power MOSFET 240 includes a body diode 242 connected to a drain D and a source S of the power MOSFET 240. A boost inductor 244 is connected to the drain D of the power MOSFET 240 and an AC voltage input $V_{IN}$ generates a boost inductor current IL through the boost inductor 244. During operation of the switching converter 200, the controller 210 drives the power MOSFET 240, which in turn drives a load 260 attached to the drain D of the power MOSFET 240 via a boost diode 262. A resistor 270, which is disposed externally to the controller 210 is connected to the drive pin 212 via the gate node 250. The drive pin 212, the current source 214, the compensation time selection circuit 216, and the resistor 270 all comprise the compensation time programming circuit 230. During operation of the switching converter 200 when the drive pin 212 is driven by the gate driver 222, the switch 218 is in a first position P1. During the programming sequence, however, the switch 218 toggles from the first position P1 to a second position P2 as illustrated by the double-sided arrow and the dashed line to allow the first current $I_1$ to flow through the drive pin 212 and ultimately through the resistor 270.

FIG. 3 is an example compensation time selection circuit 300. The compensation time selection circuit 300 can correspond to the compensation time selection circuit 216 in the example of FIG. 2. Thus, reference is to be made to both FIGS. 2 and 3 in the following description of the example of FIG. 3 and in the subsequent description of the programming sequence to program the compensation time in the controller 210. The compensation time selection circuit 300 includes an analog/digital converter (ADC) 302 and a data selector (e.g., multiplexor, latch multiplexor, etc.).

During the programming sequence, the second current $I_2$ enters the ADC 302 where the second current $I_2$ is digitized $I_d$ before entering the data selector 304. In other words, the ADC 302 transforms the second current $I_2$ into a digital number that represents a value (e.g., magnitude) of the second current $I_2$. Compensation times $T_{COMP-N}$ are stored in the data selector 304 and the value of the digitized current $I_d$ corresponds to one of the compensation times $T_{COMP-N}$. The corresponding compensation time $T_{COMP-N}$ is stored in the controller 210 and, during operation of the switching converter 200 compensates (anticipates) for the delay to switch the power MOSFET ON at the ZCD point as mentioned above.

Figure 4:
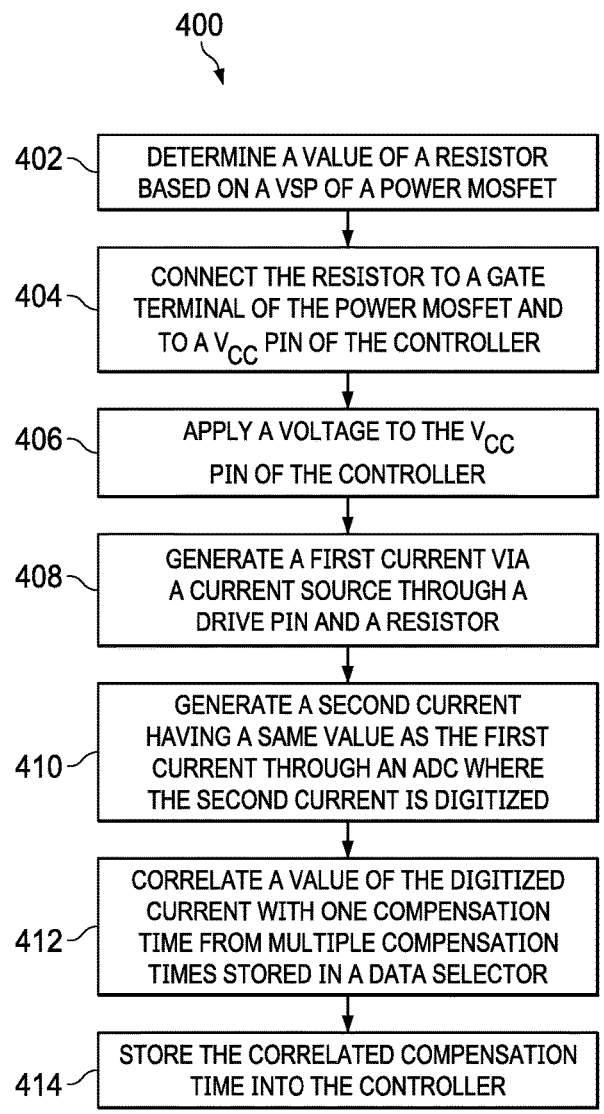
FIG. 4 is an example programming sequence to program a compensation time into a programmable controller of a switching converter.

FIG. 4 represents an example programming sequence 400 to program a compensation time into a controller (e.g., the controller 110, 210) of a switching power supply (e.g., the switching converter 100, 200). At 402, a value of a resistor (e.g., the resistor 170, 270) is chosen. The value of the resistor is based on a valley switching point of a power MOSFET (e.g., the power MOSFET 140, 240) described below in reference to FIGS. 5 and 6. At 404, the resistor is attached to a gate terminal of the power MOSFET and to a voltage input pin (e.g., $V_{CC}$) of the controller to form a gate node. At 406, a voltage is applied to the controller via the voltage input pin in the controller. At 408, a current source (e.g., the current source 214) generates a current (e.g., first current $I_1$) through a drive pin (e.g., the drive pin 112, 212) and through the resistor. As mentioned above, a value of the first current $I_1$ is based on the value of the resistor. At 410, a second current (e.g., the second current $I_2$) having the same value as the first current enters an analog/digital converter (e.g., the ADC 302) where the second current becomes digitized (e.g., the digitized current $I_d$). At 412, the digitized current enters the data selector (e.g., the data selector 304) and a value of the digitized current is correlated with one of multiple compensation times (e.g., the compensation time $T_{COMP-N}$) stored in data selector 304. In other words, the data selector functions as a look-up table where a value of the digitized current corresponds to one compensation time among the multiple compensation times. At 414, the corresponding compensation time is then stored in the controller.

Figure 5:
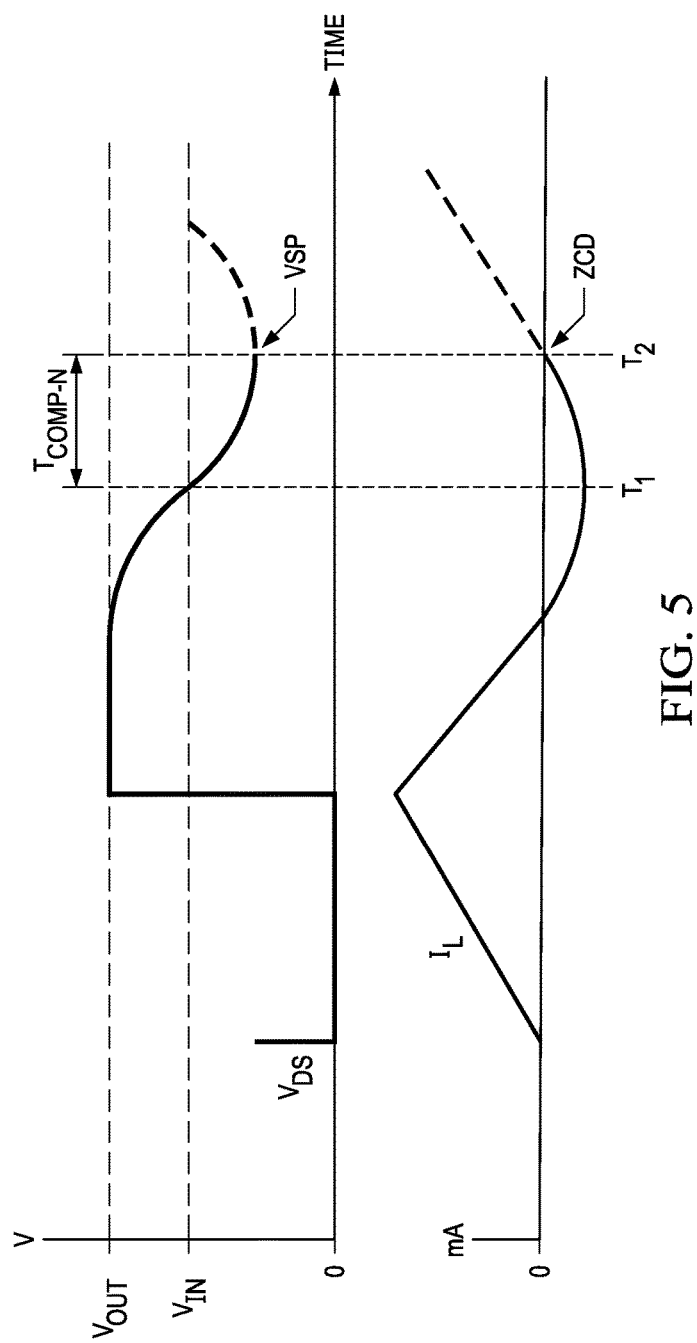
FIG. 5 is a graph illustrating a drain voltage waveform $V_{DS}$ of a drain D of an example power MOSFET and a current waveform $I_L$ of a boost inductor.

FIG. 5 is a graph 500 illustrating a drain voltage waveform $V_{DS}$ of a drain D of an example power MOSFET (e.g., the power MOSFET 240) and a current waveform $I_L$ of a corresponding boost inductor 244. As illustrated, the VSP of the power MOSFET 240 corresponds to the ZCD of the power inductor, which is the point in the switching cycle to switch the power MOSFET 240 to an ON state. Determining a value of the resistor 270 to generate the value of the first current $I_1$ (and consequently, the second current $I_2$) to program the proper compensation time $T_{COMP-N}$ into the controller 210 is based on the drain voltage waveform $V_{DS}$, and more specifically the VSP of the power MOSFET 240.

Figure 6:
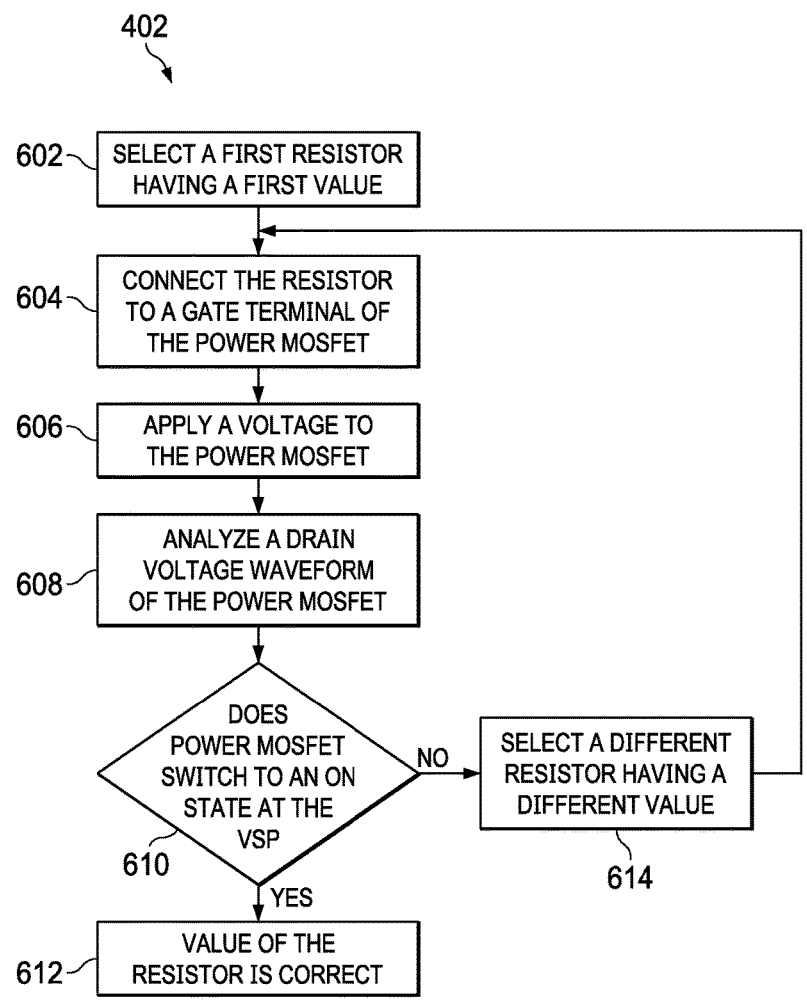
FIG. 6 is a sequence to determine a correct value of a resistor in order to program the compensation time into the programmable controller.

Specifically, FIG. 6 is a sequence 402 (see FIG. 4) to determine a correct value of the resistor 270. After the power MOSFET 240 is connected to an oscilloscope. At 602, a first resistor having a first value is selected and at 604, the first resistor is connected to the gate G of the power MOSFET 240. At 606, $V_{IN}$ is applied to the power MOSFET to display the drain voltage waveform $V_{DS}$ as shown in FIG. 5. At 608, the drain voltage waveform $V_{DS}$ is analyzed. At 610, a decision is made to determine if the power MOSFET switches to the ON state at the VSP. If YES, then at 612, the value of the resistor is correct for the given example power MOSFET. If, however, the drain voltage waveform $V_{DS}$ starts to rise after the VSP and the power MOSFET remains in an OFF state, then the first resistor value is incorrect. In this case, at 614, additional resistors (e.g., second, third, fourth, etc.) are selected having different values and the sequence loops back to 604 and repeats until the proper value of the resistor 270 is determined. After the correct resistor 270 is determined the compensation time $T_{COMP-N}$ is programmed into the controller 210 of the switching converter 200 as described above.

As illustrated in FIG. 5, $T_{COMP-N}$ is the time that the drain voltage $V_{DS}$ descends from a first time $T_1$ where $V_{DS}$ is equal to $V_{IN}$ to a second time $T_2$, which is the VSP. Because $V_{IN}$ is the input voltage to the switching converter 200, the value of $V_{IN}$ is known. Thus, when the drain voltage $V_{DS}$ is equal to $V_{IN}$ the first time $T_1$ can be measured or recorded. The second time $T_2$ can also be measured or recorded when the drain voltage waveform $V_{DS}$ reaches the VSP as described above. As a result, the compensation time $T_{COMP-N}$ is $T_1-T_2$ and can be programmed into the controller 210 of the switching converter 200, as described above.

The VSP of the power MOSFET 240 is an estimated value and during the design/programming sequence occurs at a value just above zero volts (e.g., 0.7 volts) during the ON/OFF switching cycles. The body diode 242 is intrinsic to the power MOSFET 240 and clamps the drain voltage $V_{DS}$ at the lowest value (the VSP). When the drain voltage $V_{DS}$ of the power MOSFET 240 reaches the VSP the body diode 242 turns on to prevent the drain voltage VDS from going below zero volts.

Referring back to FIGS. 2 and 3, after the compensation time $T_{COMP-N}$ is programmed into the controller 210, the compensation time $T_{COMP-N}$ is sent to the PWM generator 220. During operation of the switching converter 200, the PWM generator 220 sends a $T_{ON}$ signal to the gate driver 222 based on the compensation time $T_{COMP-N}$. During operation, the switch 218 is in the first position P1 and the gate driver 222 drives the drive pin 212, which in turn drives the power MOSFET 240.

The compensation time programming system described herein programs a compensation time into a controller, such as a power factor controller AC-DC controller, etc. of a switching converter to switch a power MOSFET on at the VSP. Compensation time, however, is only one parameter that can be programmed into a switching converter. For example, information about a specific parameter (e.g., compensation turn on time, duty cycle, switching frequency, etc.) of the integrated circuit (e.g., switching converter) can be extracted. This information can be used to program a compensation parameter into the controller to improve the efficiency of the switching converter.

Further, the system and method is adaptable to a wide range of converters. Thus, the system and method is adaptable to design and mass produce power supplies. Once the compensation time is programmed into the controller, the converter can be mass produced based on the application and the type of switching converter. If the application and switching converter change, the only modification necessary is to change the value of the resistor based on the valley switching point of the new power MOSFET.

Described above are examples of the subject disclosure. It is, of course, not possible to describe every conceivable combination of components or methodologies for purposes of describing the subject disclosure, but one of ordinary skill in the art may recognize that many further combinations and permutations of the subject disclosure are possible. Accordingly, the subject disclosure is intended to embrace all such alterations, modifications and variations that fall within the spirit and scope of the appended claims. In addition, where the disclosure or claims recite "a," "an," "a first," or "another" element, or the equivalent thereof, it should be interpreted to include one or more than one such element, neither requiring nor excluding two or more such elements. Furthermore, to the extent that the term "includes" is used in either the detailed description or the claims, such term is intended to be inclusive in a manner similar to the term "comprising" as "comprising" is interpreted when employed as a transitional word in a claim. Finally, the term "based on" is interpreted to mean at least based in part.

What is claimed is:

1. A switching converter, comprising:
 a power MOSFET having a gate terminal connected to a gate node;
 a compensation time programming circuit comprising:
  a drive pin of a controller, the drive pin connected to the gate node;
  a resistor connected to the gate node;
  a current source configured to supply a first current through the drive pin via a switch and through the resistor where a value of the current is based on a value of the resistor; and
  a compensation time selection circuit that converts a second current from the current source to a digital value, the compensation time selection circuit configured to store a plurality of compensation times; and wherein a compensation time is selected from the plurality of compensation times based on a value of the digital value of the second current, and wherein the selected compensation time compensates for a delay in switching the power MOSFET to an ON state after the power MOSFET receives a signal to switch to the ON state, so as to allow the power MOSFET to switch to the ON state when a drain voltage of the power MOSFET reaches a valley switching point during a switching cycle.

2. The switching converter of claim 1, wherein the compensation time selection circuit includes an analog-to-digital converter (ADC) and a data selector storing the plurality of compensation times.

3. The switching converter of claim 2, wherein the ADC is configured to convert the second current into the digital number representing a value of the second current and wherein the value of the second current corresponds to the selected compensation time from the plurality of compensation times.

4. The switching converter of claim 3, further comprising a pulse width modulation (PWM) generator configured to receive the selected compensation time from the data selector.

5. The switching converter of claim 4, further comprising a gate driver configured to receives a PWM signal from the PWM generator to drive the drive pin at the selected compensation time to switch the power MOSFET to the ON state when the drain voltage reaches the valley switching point.

6. The switching converter of claim 1, further comprising a body diode connected to a drain and a source of the power MOSFET and wherein the body diode configured to clamp the drain voltage at the valley switching point.

7. The switching converter of claim 1, wherein the controller includes a power factor correction controller.

8. A method of programming a switching converter, comprising:

selecting a resistor having a value that corresponds to a valley switching point of a drain voltage of a power MOSFET;

attaching the resistor to a gate terminal of the power MOSFET and to a voltage input pin of a controller in the switching converter to form a gate node;

applying a voltage to an input pin of a controller in the switching converter;

generating a first current through the drive pin via a switch and through the resistor;

generating a second current having a same value as the first current through a compensation time selection circuit where the compensation time selection circuit transforms the second current into a digital value;

correlating the digital value of the second current with a compensation time from a plurality of compensation times stored in the compensation time selection circuit; and programming the correlated compensation time in the controller, wherein the programmed compensation time compensates for an inherent delay in switching the power MOSFET to an ON state after the power MOSFET receives a signal to switch to the ON state to allow the power MOSFET to switch to the ON state when a drain voltage of the power MOSFET reaches the valley switching point during a switching cycle.

9. The method of claim 8, wherein selecting a resistor having the value that corresponds to a valley switching point of a drain voltage of a power MOSFET includes selecting a first resistor having a first value, attaching the first resistor to the gate terminal of the power MOSFET, and applying a voltage to the power MOSFET.

10. The method of claim 9 further comprising analyzing the drain voltage waveform and determining if the power MOSFET switches to the ON state at the drain voltage valley switching point.

11. The method of claim 8, wherein the compensation time selection circuit includes an analog-to-digital converter that transforms the second current into the digital value.

12. The method of claim 8, wherein the compensation time selection circuit includes a data selector that stores the plurality of compensation times.

* * * * *